United States Patent
Asplund et al.

(10) Patent No.: US 9,199,627 B2
(45) Date of Patent: Dec. 1, 2015

(54) METHOD FOR DETERMINATION OF MOTIVE FORCE CAPACITY OF A MOTOR VEHICLE

(75) Inventors: Peter Asplund, Mariefred (SE); Anders Kjell, Ekerö (SE); Mikael Wägberg, Södertälje (SE); Fredrik Swartling, Södertälje (SE)

(73) Assignee: SCANIA CV AB (SE)

( * ) Notice: Subject to any disclaimer, the term of this patent is extended or adjusted under 35 U.S.C. 154(b) by 5 days.

(21) Appl. No.: 13/515,865

(22) PCT Filed: Dec. 16, 2010

(86) PCT No.: PCT/SE2010/051397
§ 371 (c)(1),
(2), (4) Date: Jun. 14, 2012

(87) PCT Pub. No.: WO2011/075064
PCT Pub. Date: Jun. 23, 2011

(65) Prior Publication Data
US 2012/0259520 A1    Oct. 11, 2012

(30) Foreign Application Priority Data
Dec. 17, 2009   (SE) ......................... 0950970

(51) Int. Cl.
*F16H 61/00* (2006.01)
*B60W 40/06* (2012.01)
(Continued)

(52) U.S. Cl.
CPC ............. *B60W 10/06* (2013.01); *B60W 10/10* (2013.01); *B60W 30/16* (2013.01); *B60W 2530/16* (2013.01)

(58) Field of Classification Search
CPC ............................. B60K 41/12; B60K 41/04
USPC ....................................................... 701/51–58
See application file for complete search history.

(56) References Cited

U.S. PATENT DOCUMENTS

| | | | | |
|---|---|---|---|---|
| 4,598,611 A | * | 7/1986 | Frank ............................... | 477/39 |
| 5,079,705 A | * | 1/1992 | Sakai et al. ..................... | 701/57 |
| 5,540,632 A | * | 7/1996 | Lardy et al. ..................... | 477/43 |

(Continued)

FOREIGN PATENT DOCUMENTS

| | | |
|---|---|---|
| JP | 07-239021 | 9/1995 |
| JP | 09-002100 | 1/1997 |

(Continued)

OTHER PUBLICATIONS

International Search Report mailed Apr. 1, 2011 in corresponding PCT International Application No. PCT/SE2010/051397.

(Continued)

*Primary Examiner* — Calvin Cheung
*Assistant Examiner* — Martin Weeks
(74) *Attorney, Agent, or Firm* — Ostrolenk Faber LLP

(57) ABSTRACT

A method for determination of a first parameter $R_F$ which represents a motive force capacity of a motor vehicle (1) provided with a power train which may assume various transmission ratios for propulsion of the vehicle (1). The vehicle includes an engine (10) and a gearbox (20). The first parameter $R_F$ is determined on the basis of a difference between a first motive force $F_{Max}$ and a second motive force $F_{Dr}$. The first motive force $F_{Max}$ is a maximum motive force available for the vehicle (1) at a current transmission ratio. The second motive force $F_{Dr}$ is a current running resistance for the vehicle (1). There is a use of such a parameter. A computer program, a computer program product, a system and a motor vehicle related to such a parameter are disclosed.

14 Claims, 5 Drawing Sheets

(51) Int. Cl.
*F16H 59/48* (2006.01)
*B60W 10/06* (2006.01)
*B60W 10/10* (2012.01)
*B60W 30/16* (2012.01)

(56) References Cited

U.S. PATENT DOCUMENTS

| | | | |
|---|---|---|---|
| 5,672,139 A | 9/1997 | Horiguchi | 477/120 |
| 6,027,425 A | 2/2000 | Sakaguchi | 477/48 |
| 6,157,885 A * | 12/2000 | Sakaguchi et al. | 701/54 |
| 6,216,073 B1 | 4/2001 | Horiguchi et al. | 701/51 |
| 6,246,942 B1 * | 6/2001 | Dobler et al. | 701/51 |
| 6,427,108 B1 | 7/2002 | Kanasugi et al. | 701/51 |
| 7,680,575 B2 * | 3/2010 | Han et al. | 701/51 |
| 2004/0020283 A1 | 2/2004 | Minami | 73/118.1 |
| 2005/0143221 A1 | 6/2005 | Kuwahara et al. | 477/97 |
| 2006/0155450 A1* | 7/2006 | Aubert | 701/51 |
| 2009/0265067 A1* | 10/2009 | Wolfgang et al. | 701/58 |

FOREIGN PATENT DOCUMENTS

| | | |
|---|---|---|
| JP | 10-122357 | 5/1998 |
| JP | 10-299882 | 11/1998 |
| JP | 2004-058859 | 2/2004 |
| JP | 2004-360657 | 12/2004 |
| JP | 2009-228779 | 10/2009 |

OTHER PUBLICATIONS

Korean Office Action dated Aug. 8, 2013 issued in Korean Application No. 10-2012-7018812 (with English translation).

Japanese Office Action dated May 21, 2013 issued in Japanese Patent Application No. 2012-544435 (English translation).

Russian Federation Office Action, dated Sep. 23, 2013, issued in corresponding Russian Patent Application No. 2012130059/01(047285), filed Dec. 16, 2010. English translation. Total 3 pages.

* cited by examiner

METHOD FOR DETERMINATION OF MOTIVE FORCE CAPACITY OF A MOTOR VEHICLE

CROSS-REFERENCE TO RELATED APPLICATIONS

The present application is a 35 U.S.C. §§371 national phase conversion of PCT/SE2010/051397, filed Dec. 16, 2010, which claims priority of Swedish Application No. 0950970-4, filed Dec. 17, 2009, the contents of which are incorporated by reference herein. The PCT International Application was published in the English language.

TECHNICAL FIELD

The present invention relates to a method for determination of a parameter which represents a motive force capacity of a motor vehicle. The invention relates also to use of such a parameter, and further to a computer program, a computer program product, a system and a motor vehicle related to such a parameter.

BACKGROUND TO THE INVENTION

FIG. 1 depicts schematically parts of a power train for a motor vehicle 1, e.g. a passenger car or a heavy motor vehicle such as a truck or bus. The power train comprises an engine 10 which in this case is mechanically connected by a shaft to a first end of a gearbox 20 via a clutch device 40. The gearbox 20 has its second end mechanically connected by a propeller shaft 50 to a differential gear 30 associated with a rear axle. The rear axle comprises left and right drive shafts 60 which drive the undepicted powered wheels of the vehicle 1.

By this well-known arrangement the mechanical work of the engine 10 is transferred, via a number of transmission devices such as clutch device 40, gearbox 20, propeller shaft 50, differential gear 30 and drive shafts 60, to powered wheels for propulsion of the vehicle 1. The gearbox 20 is a transmission device which has a number of forward gears for propelling the vehicle 1 forwards and usually also one or more reverse gears. The number of forward gears varies but twelve forward gears are for example usual in trucks of more modern kinds.

The transmission ratio of a power train may vary, enabling it to assume various ratios (i.e. various transmission ratio configurations). The various ratios depend inter alia on the gear currently engaged in the gearbox 20 and on the ratio of the differential gear 30. It may further be noted that there are power trains which can assume a number of different discrete transmission ratios and also power trains which have a continuous range of ratios, e.g. automatic gearboxes 20 with so-called converters or other types of gearboxes 20 with continuously variable transmissions.

In addition, most motor vehicles 1 have a control system comprising one or more electronic control units 110 (ECUs). The purpose of said control system is to control/regulate one or more functions in the vehicle 1, e.g. by means of one or more actuators which may be related to various functions in the vehicle 1, such as engine control, gear changing, cruise control, suspension configuration, etc., and said control system uses a number of different parameters, e.g. current engine speed, current accelerator pedal position, current engine torque, and data from various sensors, to control the various functions of the vehicle 1. These parameters are therefore used as input parameters in the control system for controlling the various functions in the vehicle 1.

BRIEF DESCRIPTION OF THE INVENTION

An object of the present invention is to propose a method for determination of a parameter which takes into account the running situation of a motor vehicle, e.g. a passenger car, bus or truck. Another object of the invention is to propose a method for use of such a parameter in applications related to one or more functions in, for example, a motor vehicle. A further object of the invention is to propose a parameter which may be used to improve the control and/or performance of one or more functions in a motor vehicle as compared with using prior art parameters.

According to an aspect of the invention, the above objects are achieved with a method for determination of a first parameter $R_F$ which represents a motive force capacity of a motor vehicle (1) provided with a power train which is adapted to assuming various transmission ratios for propulsion of said vehicle (1) and which comprises at least one engine (10) and at least one gearbox (20). This first parameter $R_F$ is determined on the basis of a difference between a first motive force $F_{Max}$ and a second motive force $F_{Dr}$, the first motive force $F_{max}$ being a maximum motive force available for the vehicle (1) at a current transmission ratio and the second motive force $F_{Dr}$ a current running resistance for the vehicle (1).

An embodiment of the above method further comprises determination of a second parameter $R_{Acc}$ which represents an acceleration capacity of the vehicle (1) and which is defined as the ratio between said first parameter $R_F$ above and a standardising factor. Further embodiments of the above method are expressed in the dependent claims pertaining to the method.

The invention relates also to a computer program and a computer program product related to the above methods.

According to another aspect of the invention, the above objects are achieved with a system for determination of a first parameter $R_F$ which represents a motive force capacity of a motor vehicle (1), which system comprises at least one control unit (110) adapted to controlling one or more functions of said vehicle (1) provided with a power train which is adapted to assuming various transmission ratios for propulsion of said vehicle (1) and which comprises at least one engine (10) and at least one gearbox (20). This control unit (110) is adapted to determining said first parameter $R_F$ on the basis of a difference between a first motive force $F_{Max}$ and a second motive force $F_{Dr}$, the first motive force $F_{Max}$ being a maximum motive force available for the vehicle (1) at a current transmission ratio and the second motive force $F_{Dr}$ a current running resistance for the vehicle (1).

The invention further relates to use of a parameter determined according to any of the above methods or systems. The invention relates also to a motor vehicle comprising at least one such system.

A method and a system according to the present invention result in a parameter which comprises and takes into account a motor vehicle's running situation when determining its motive force capacity. Such a parameter is therefore usable in a range of applications related to control and monitoring of various functions, and one direct application is in modelling of a virtual accelerator pedal position or a virtual driver. Moreover, the results of any of said modelling are themselves usable indirectly in other applications, e.g. in choice of gear change strategy and indication of hints for drivers.

Further advantages and applications with a device and a system according to the invention will be indicated by the detailed description set out below.

BRIEF DESCRIPTION OF THE DRAWINGS

The detailed description of the present invention set out below describes embodiments of the invention with reference to the attached drawings, in which.

DETAILED DESCRIPTION OF THE INVENTION

Figure 1:
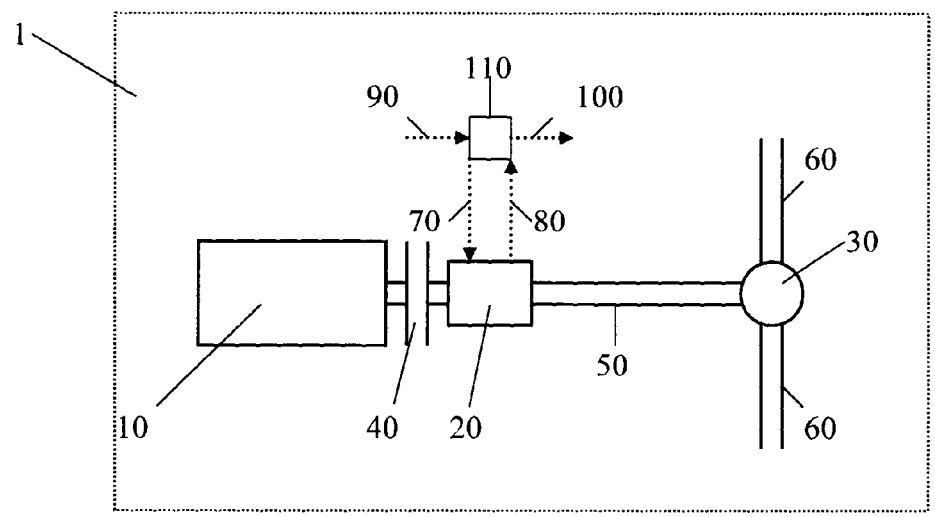
FIG. 1 depicts schematically part of a power train for a motor vehicle.

As mentioned above, a control system of a motor vehicle 1 uses a number of input parameters for control of various functions in the vehicle 1. These input parameters may for example be current engine speed, current accelerator pedal position, current engine torque and data from one or more sensors with which the vehicle 1 is provided.

However, the inventors have gained the insight that using such parameters according to the state of the art may lead to control/regulation of the functions of the vehicle 1 taking place in a less advantageous way because input parameters according to the state of the art do not take into the account the momentary running situation of the vehicle 1 and may therefore be said to have an insufficiently comprehensive information content. For example, a gear change strategy may tend to become static and fuel consumption be higher than necessary because of said running situation not being taken into account when these input parameters are determined according to the state of the art. Examples of various running situations comprise driving a vehicle 1 on upgrades, downgrades, hill crests and dips, i.e. running situations substantially related to road gradient in the direction of movement of the vehicle 1, but also such factors as varying wind resistance, varying vehicle weight, etc.

The above shows that there is a need for a method and a system for determination of a parameter which takes running situations of a vehicle 1 into account. This parameter may preferably be used as an input parameter in a range of applications related to various functions in a vehicle 1.

The present invention thus relates to a method for determination of a first parameter $R_F$ which is representative of a motive force capacity of a motor vehicle 1, e.g. a passenger car, bus or truck. The vehicle 1 is provided with a power train which is adapted to assuming various transmission ratios for propulsion of the vehicle 1 and which comprises at least one engine 10 and at least one gearbox 20.

According to the invention, the first parameter $R_F$ is determined on the basis of a difference between a first motive force $F_{Max}$ and a second motive force $F_{Dr}$, the first motive force $F_{Max}$ being a maximum motive force available for the vehicle 1 at a current power train transmission ratio and the second motive force $F_{Dr}$ a current running resistance for the vehicle 1. Current power train transmission ratio means the respective ratio for the power train which propels the vehicle 1.

More specifically, the first parameter $R_F$ may be construed as a difference between a first motive force $F_{Max}$ which represents the maximum sum of the available motive forces which "help" to propel the vehicle 1 in its direction of movement at a current power train transmission ratio, i.e. the available motive force of the vehicle 1, minus a second motive force $F_{Dr}$ which is the sum of the motive forces which act upon the vehicle 1 in its direction of movement or the opposite direction thereto, and is its current running resistance.

Figure 2:
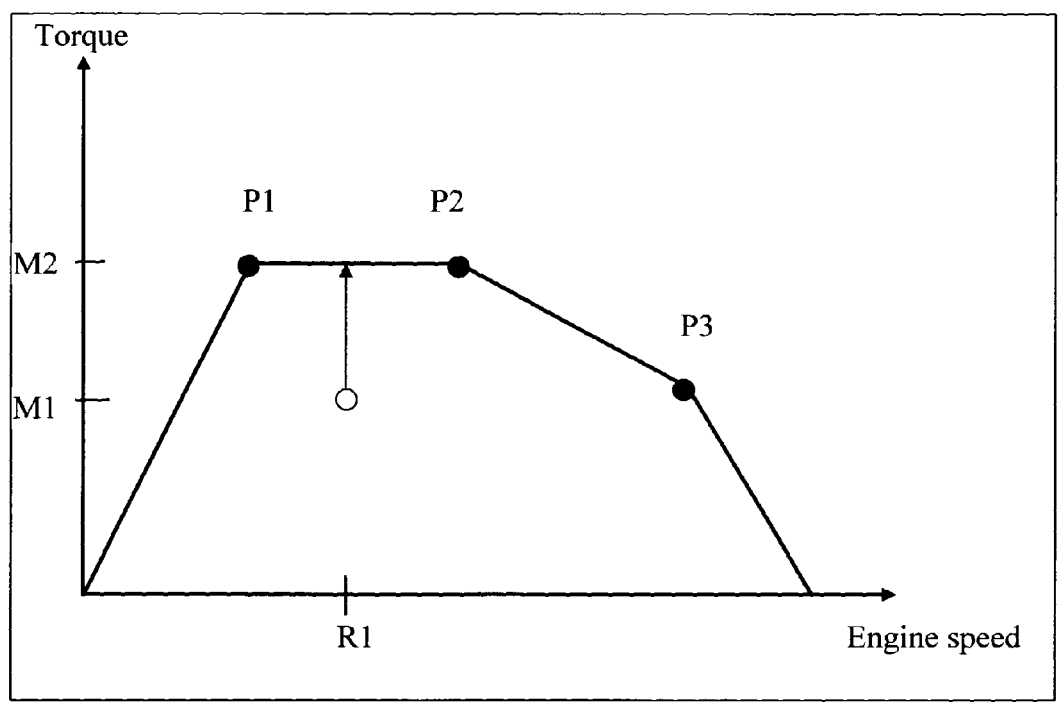
FIG. 2 is a graph of maximum torque as a function of the speed of an engine.

FIG. 2 is a graph of a maximum torque curve for an engine 10 as a function of its speed. The points P1-P3 in the graph represent various break points for the maximum torque curve. The graph also pertains to an example of a situation where an engine 10 runs at a speed R1 with an engine torque M1, thus operating below its maximum torque curve by a difference equal to M2-M1 which is illustrated by an arrow. Maximum motive force therefore means the motive force which, via the power train, propels the vehicle 1 in its direction of movement if the engine 10 operates on its maximum torque curve at a current engine speed.

More specifically the first motive force $F_{Max}$ according to an embodiment of the invention is defined as $$F_{max} = \text{Eng}_{Tot} \times i_{Tot} \qquad (1),$$

where $\text{Eng}_{Tot}$ denotes an available twisting moment at maximum engine torque for the engine 10 at current engine speed, and $i_{Tot}$ denotes a current transmission ratio for the power train up to and including the powered wheels of the vehicle 1, taking the wheel radius into account.

According to another embodiment, the second motive force $F_{Dr}$ is a motive force which can assume a positive value (e.g. on upgrades) or a negative value (e.g. on downgrades) and acts in the opposite direction to the direction of movement of the vehicle 1. The second motive force $F_{Dr}$ depends on one or more parameters from among air resistance, rolling resistance, friction in said power train, moment of inertia, weight of said vehicle 1, road gradient, i.e. the factors which influence the current running resistance. However, topographical map data and the like may also be used in determining the second motive force $F_{Dr}$, since for example the road gradient can be derived from relevant map data.

More specifically, the second motive force $F_{Dr}$ according to an embodiment of the invention is defined as $$F_{Dr} = F_{Rf} - m \times a \qquad (2),$$

where $F_{Rf}$ denotes a current actual motive force for the engine 10, m the weight and a the acceleration of the vehicle 1. In the example in FIG. 2, the actual motive force of the engine 10 is equal to M1.

In the great majority of cases, the second motive force $F_{Dr}$ will be the motive force which varies the more, since for example the road gradient is a parameter which affects it. However, the first motive force $F_{Max}$ will also vary, since the power train transmission ratio varies with such factors such as current transmission ratio in the gearbox 20, wheel radius of the vehicle 1, variations in the maximum torque curve of the engine 10, etc. For the most part, however, the engine power and the transmission ratio for the differential gear which also form part of the expression for the first motive force $F_{Max}$ will be constant.

According to a further embodiment of the invention, the first parameter is determined as $$R_F = F_{Max} - F_{Dr} \tag{3}$$

i.e. the first parameter $R_F$ is defined as a difference according to equation (3) and will assume a negative value, a positive value or a zero value. A negative difference means that the vehicle 1 cannot accelerate at the current power train transmission ratio, i.e. the vehicle 1 is in power deficit and will lose speed (i.e. be retarded); a zero difference means that the vehicle 1 is in a state of power equilibrium in which it can maintain the current speed but not accelerate to a higher speed; and a positive difference means that the vehicle 1 has the potential to accelerate, at least if the engine 10 operates on its maximum torque curve for a given engine speed, as depicted in FIG. 2, i.e. the vehicle 1 has a power surplus.

The first parameter $R_F$ provides an absolute measure of the current motive force capacity/acceleration capacity of the vehicle 1, since it is related to its current characteristics and running situation, which means inter alia that for the first parameter $R_F$ to be usable it needs to be related to said characteristics and running situation. Examples of characteristics are vehicle weight, engine power, and power train configuration; and examples of running situations are road gradient and road surface. Since the first parameter $R_F$ is an absolute measure, a value of, for example, $R_F$=10000 N represents a large acceleration capacity for a vehicle 1 weighing 1000 kg and a very small acceleration capacity for a vehicle 1 weighing 100000 kg.

In contrast, a standardisation of the difference according to equation (3) with reference to the current available motive force capacity of the vehicle 1 provides a relative measure of the vehicle's current acceleration capacity (specialists will appreciate that acceleration may of course also be derived from the first parameter $R_F$ on the basis of the relation between acceleration and power according to the laws of physics), which is to be construed as its ability to accelerate. The result arrived at is a dimensionless unit comprising information about the engine power of the vehicle 1, the road gradient, rolling resistance, wind resistance etc.

The advantage of a relative measure as above is that it provides a value which indicates how much of the available engine power will be required to be able to accelerate the vehicle 1. This means that said value can with advantage be used directly or indirectly in various applications related to different functions, e.g. control strategies as regards, for example, choice of transmission ratio, running of generator, running of air compressor etc. If the calculation of $R_{Acc}$ produces the result that the engine power will not be sufficient to accelerate the vehicle 1, the control system can try to "go easy" on the resources which absorb energy (e.g. air compressor, generator etc.), while at the same time trying to run the engine 10 at a speed which delivers maximum motive force. This means the control system trying to use as much as possible of the torque of the engine 10 to propel the vehicle 1 instead of, for example, filling the air tanks with air, which the system will endeavour to do at times when it has the possibility of using energy "free of charge", e.g. during engine braking of the vehicle 1 on downgrades. It will therefore be appreciated that said parameter is usable in many different functions in a vehicle 1, and in the description below it is referred to as a second parameter $R_{Acc}$.

Thus an embodiment of the invention relates to a method for determination of a second parameter $R_{Acc}$ which represents an acceleration capacity of a motor vehicle 1 and which is determined as a ratio between the first parameter $R_F$ and a standardising factor. In a preferred embodiment, the second parameter is determined as $$R_{Acc} = \frac{F_{Max} - F_{Dr}}{F_{Max}} = \frac{R_F}{F_{Max}}, \tag{4}$$

where the term in the denominator is a standardising factor, so the vehicle 1 is in acceleration surplus if $R_{Acc}>0$, in acceleration deficit if $R_{Acc}<0$ and in acceleration equilibrium if $R_{Acc}=0$. Moreover, if $R_{Acc}>1$, all of the engine power can be used to accelerate the vehicle 1, in which case it gains speed without any power having to be supplied from the engine 10 (as on steep downgrades).

The second parameter $R_{Acc}$ is usable within many areas of application related to different functions in a vehicle 1, e.g. in determining a "virtual accelerator pedal value" which is thereafter usable as input data in further other applications in the vehicle 1.

In the light of the above, the present invention thus relates also to use of the first parameter $R_F$ and/or the second parameter $R_{Acc}$ in a number of different applications related to various functions in a vehicle 1, such as:

Determination of a virtual accelerator pedal value or a virtual driver;
Control of gear change choice and choice of gear change strategies;
Control of ancillaries, e.g. compressor, generator and AC pump;
Driver hints, such as for deciding whether a driver drives economically or not, e.g. when reversing; and
Speed maintenance by cruise control.

As mentioned above, the first parameter $R_F$ or the second parameter $R_{Acc}$ may be used to determine a virtual accelerator pedal value. In this context, virtual accelerator pedal value means a theoretically calculated value which may be, and usually is, different from the actual accelerator pedal value, the latter being the actual value assumed by the accelerator pedal when a driver depresses it while the vehicle 1 is in motion. If the second parameter $R_{Acc}$ is used to calculate such a virtual accelerator pedal value, this may be done by means of a mapping function such as depicted in the graph in FIG. 3, where the virtual accelerator pedal value Pv (the y axis) is plotted against the second parameter $R_{Acc}$ (the x axis) which represents the acceleration capacity for the vehicle 1.

Figure 3:
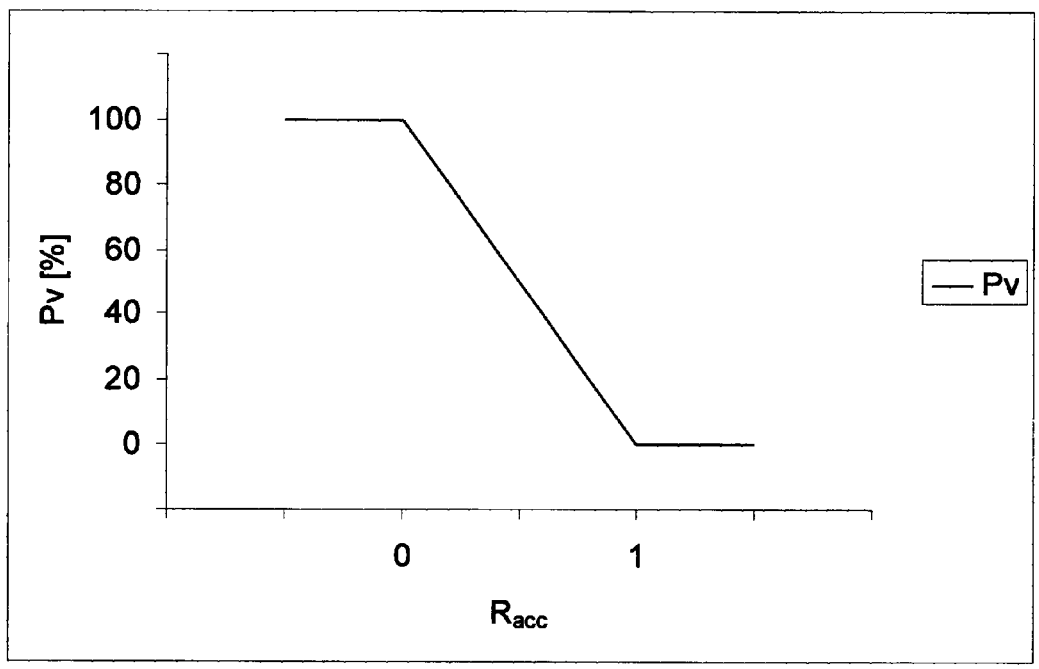
FIG. 3 is a graph of a mapping function which converts values representing a motor vehicle's acceleration capacity to virtual accelerator pedal values.

FIG. 3 shows how the virtual accelerator pedal value is converted by said mapping function to 100%, corresponding to full acceleration, when the second parameter $R_{Acc}$ assumes a value smaller than 0, and to 0%, corresponding to no acceleration, when $R_{Acc}$ assumes a value larger than 1. Such mapping of the second parameter $R_{Acc}$ means that the virtual accelerator pedal value is converted to 100% in situations of power equilibrium or power deficit, i.e. when $R_{Acc} \leq 0$, and somewhere 0 and 100% when the vehicle is in power surplus (in FIG. 3 the function is linear within this range).

When the whole of the engine power can be used to accelerate the vehicle 1, i.e. when $R_{Acc}=1$, the accelerator pedal value is converted to 0%, a situation in which a possible application might be to try to mimic an accelerator pedal movement which an actual driver makes when he/she is driving economically and wishes to maintain constant speed, i.e. easing off the power at hillcrests and on downgrades and applying more power at the beginning of climbs and on upgrades. The behaviour of an actual driver is thus modelled by a virtual driver according to that application. It will therefore be appreciated that the virtual accelerator pedal value is usable in a range of applications which depend on an accelerator pedal value, e.g. modelling of virtual drivers in order to provide hints for drivers, control of ancillary units, indication of hints for drivers, etc. It should also be noted that the virtual accelerator pedal value may be used either as the sole input parameter in said applications or in combination with other input parameters, e.g. the actual accelerator pedal value.

Figure 4:
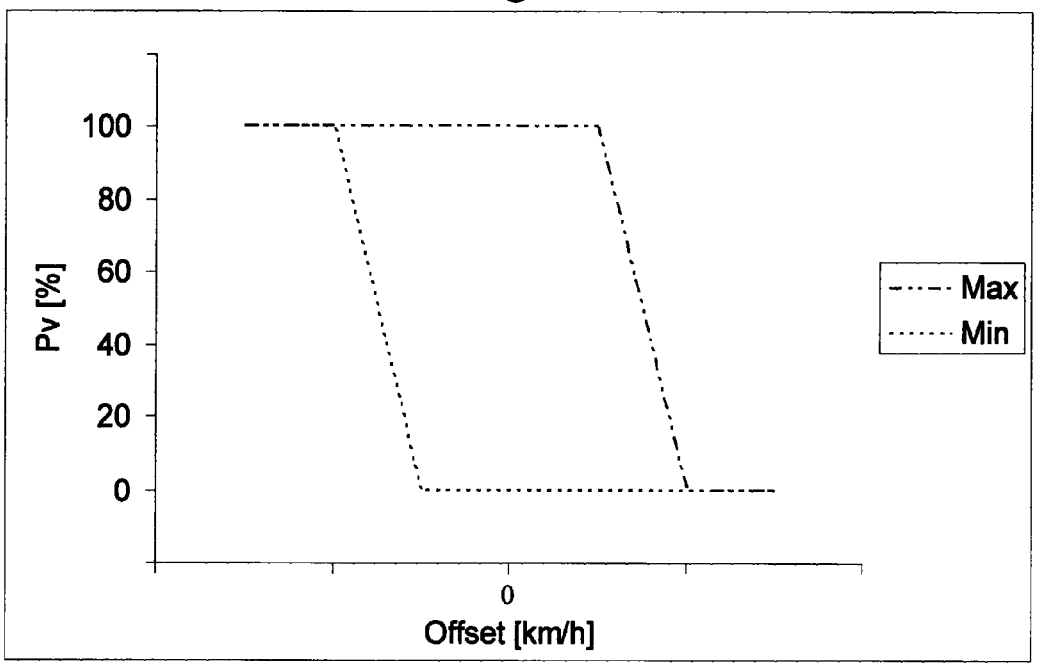
FIG. 4 is a graph of a mapping function which converts values representing a motor vehicle's acceleration capacity to virtual accelerator pedal values with reference to a cruise control setting.

FIG. 4 depicts an example of a mapping function of a virtual accelerator pedal value when using a cruise control. They axis represents permissible values for a virtual accelerator pedal and the x axis a difference between a desired speed locked on the cruise control (i.e. the desired speed set on the cruise control) and the current actual speed of the vehicle 1. This difference between the two speeds will define permissible values which the virtual accelerator pedal can assume, and the virtual accelerator pedal value of the second parameter $R_{Acc}$ is determined between these extreme values (e.g. by means of a mapping function depicted in FIG. 3). For example, when running on cruise control, the control system knows the speed which the driver wishes the vehicle 1 to run at and it is therefore possible to take into account the deviation (offset) from $V_{Set}$, i.e. the desired speed corresponding to an offset value of 0 in FIG. 4. If the speed drops below $V_{set}$, the freedom of movement of the pedal value decreases and the pedal value is forced towards the maximum value (Max in FIG. 4). Similarly, if the speed rises above $V_{Set}$, the freedom of movement likewise decreases and the pedal value is forced consistently towards the minimum value (Min in FIG. 4) with the object of keeping the vehicle 1 at the desired speed $V_{Set}$.

Such a version means that the second parameter $R_{Acc}$ will be an input parameter in the accelerator pedal calculation relating to a cruise control application where the system tries to maintain a constant speed of the vehicle 1, depending on various running conditions, e.g. road gradient, and the limitations of the accelerator pedal value indicate whether the system wishes to increase/decrease the vehicle's speed. In an application such as this, the system tries to use a virtual driver to model an actual driver trying to maintain a constant speed, which means that if the vehicle 1 is over/under the target speed this is compensated for by the speed being decreased or increased respectively. In contrast, if the vehicle 1 is at the desired speed, it is ambient factors such as road gradient, wind resistance, vehicle weight etc. which determine the accelerator pedal value ($R_{Acc}$ in the model).

The system may further model a virtual accelerator pedal position applied by a notional driver who drives the vehicle 1 economically, e.g. by easing off the accelerator over hill crests and on downgrades, and applying more acceleration when the vehicle 1 is beginning a climb. The virtual accelerator pedal position may then be used as an input parameter in the systems belonging to the vehicle 1 which use the actual accelerator pedal position as an input parameter. Such a procedure may then be used for example to guide gear choices in a vehicle 1 which is running on cruise control, taking the virtual accelerator pedal into account, affording the possibility of gear changes which result in very low engine speed and hence also reduced fuel consumption and mechanical wear. An example of such situations is on downgrades where the engine 10 is "trailed", i.e. engine braking is applied. Engaging a high gear (e.g. an overdrive) in such a situation, resulting in a very low engine speed, reduces the friction of the engine 10 and makes it possible instead for the vehicle 1 to accelerate by using the energy it would otherwise have lost by engine braking.

Figure 9:
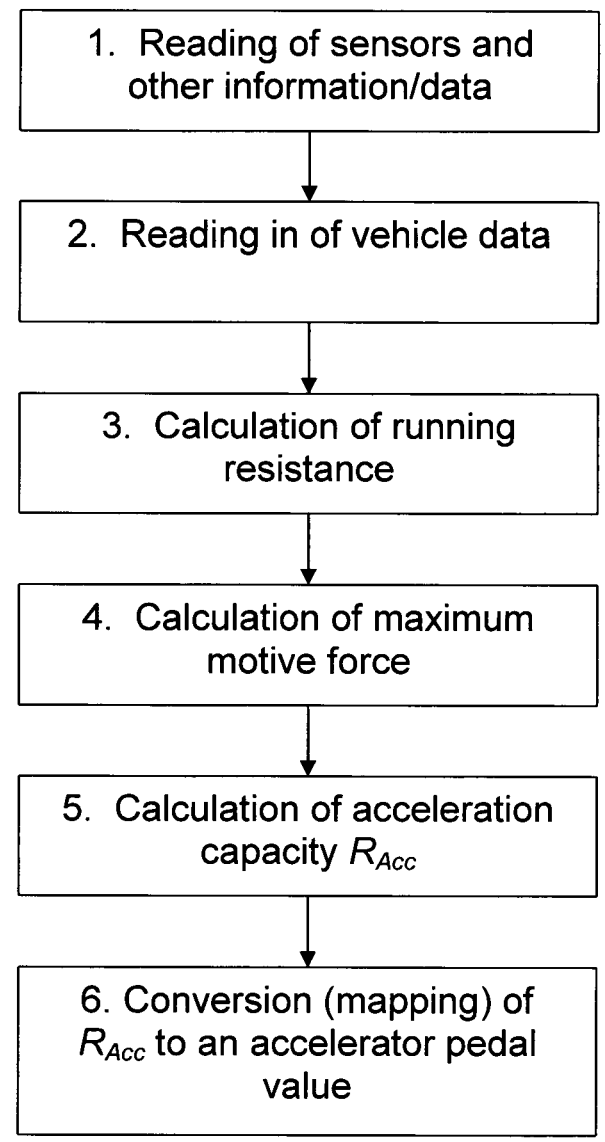
FIG. 9 is a flowchart for determination of a virtual accelerator pedal value by use of values for a motor vehicle's acceleration capacity.

In more detail, determination of a virtual accelerator pedal value may for example take place according to the flowchart in FIG. 9, comprising the following steps:

1. Reading various sensors with which the vehicle 1 is provided, and reading available information/data from other systems in the vehicle 1, e.g. from engine control system, brake control system and gearbox control system;
2. Reading in vehicle data about the configuration of the control unit, comprising relevant information about the configuration of the vehicle 1, e.g. differential transmission ratio, type of gearbox 20, etc.;
3. Calculating the current running resistance $F_{Dr}$ of the vehicle 1 on the basis of information/data received at steps 1 and 2 above;
4. Calculating the current maximum driving power $F_{Max}$ of the vehicle 1 at the current power train transmission ratio on the basis of the maximum flywheel torque which the engine 10 can deliver at current engine speed (compare with the torque curve in FIG. 2);
5. Calculating on the basis of values received at steps 3 and 4 above the acceleration capacity $R_{Acc}$ of the vehicle 1, which is determined as the motive force capacity $R_F$ standardised by a standardising factor; and
6. Converting the acceleration capacity $R_{Acc}$ of the vehicle 1 to a virtual accelerator pedal value (Pv), which may be done by any of the previously described mapping methods.

Figure 5:
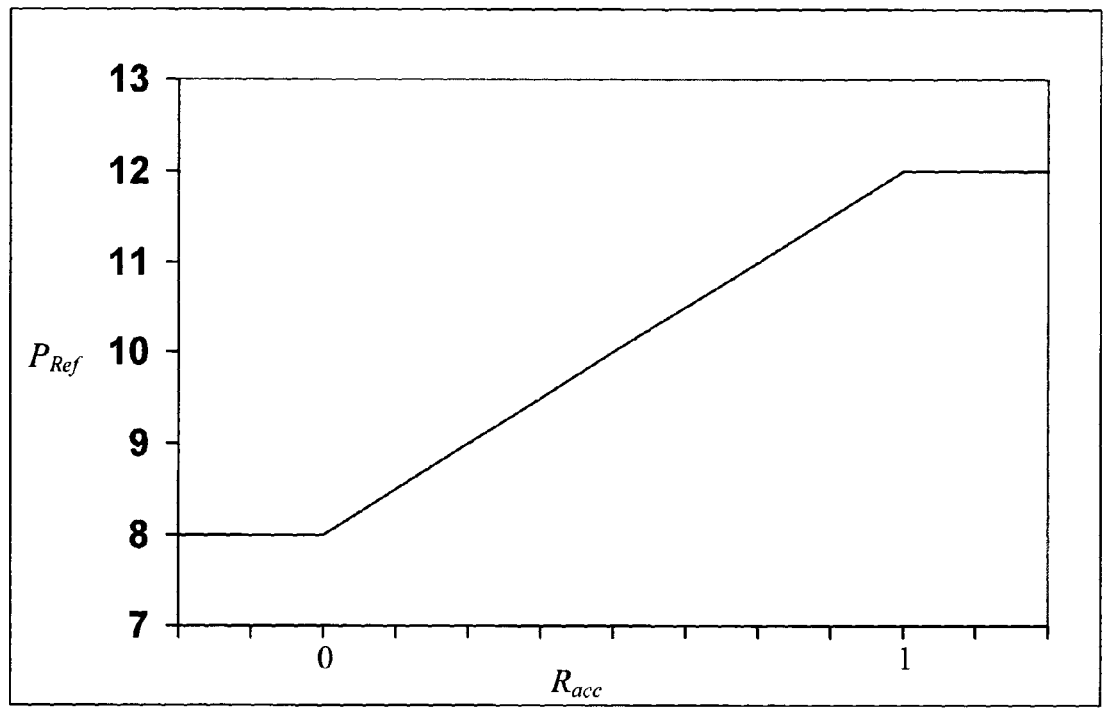
FIG. 5 is a graph of the reference pressure for an air compressor as a function of the acceleration capacity for a motor vehicle, usable in deciding when the vehicle's air tanks should be pressurised.

Another use of the first parameter $R_F$ and/or the second parameter $R_{Acc}$ is in controlling various ancillaries, e.g. air compressors, generators and AC (air conditioning) pumps in the vehicle 1. Controlling an air compressor may be done in such a way that the reference pressure which the compressor has for charging of air is raised when the vehicle 1 is in power surplus/acceleration surplus, which means that the system utilises the surplus energy which for example accrues on downgrades to drive the compressor in these situations and thereby endeavour to have a high pressure in the air tanks when the system has energy available "free of charge", and conversely a lower pressure in the air tanks when the energy has to be taken from the engine 10, which means that the system avoids driving the air compressor when fuel is being injected into the engine 10, thus avoiding power output going to the air compressor in such situations. FIG. 5 illustrates an example of how the reference pressure of air compressors can be directly controlled by means of the second parameter $R_{Acc}$. This example shows how the reference pressure $P_{Ref}$ is expressed as a function of the acceleration capacity $R_{Acc}$ of the vehicle 1. The function in FIG. 5 shows that the reference pressure $P_{Ref}$ is low when the vehicle 1 is in acceleration deficit (power deficit) and high when it is in acceleration surplus (power surplus), with a linear increase in reference pressure between them. The reference pressure $P_{Ref}$ may also be controlled indirectly by the second parameter $R_{Acc}$ by being made dependent on a virtual accelerator pedal value which is itself determined by the second parameter $R_{Acc}$.

A further use of the first parameter $R_F$ and/or the second parameter $R_{Acc}$ is in determination of gear change choice and gear change strategy for a gearbox 20.

The gearbox 20 in a vehicle 1 is usually of manual or automatic type (automatic gearbox), but also of the automatic manual gearbox type (automatic manual transmission, AMT) type. Automatic gearboxes and automatic manual gearboxes are automated gearbox systems usually controlled by a control unit 110 which is adapted to controlling the gearbox 20, e.g. during gear changing, as when choosing gears at a certain vehicle speed with a certain running resistance. The control unit 110 may measure engine speed and the state of the gearbox 20 and control the gearbox by means of solenoid valves connected to compressed air devices. Information about the engine 10, e.g. its speed and torque, is also sent from the engine 10 to the control unit 110, e.g. via a CAN (controller area network) bus.

In conventional gear change systems, the control unit 110 uses tabulated engine speed limits, also called shift points, which represent the engine speed at which a downshift or upshift should be effected in the gearbox 20, i.e. the vehicle 1 changes gear when the speed of its engine 10 passes a speed represented by a shift point. The shift points may therefore be construed as providing information not only about when a downshift or upshift should take place but also about the number of gear steps to be effected at each downshift or upshift. It is usual for each shift point to comprise one to three gear steps, but more steps are possible.

Figure 6:
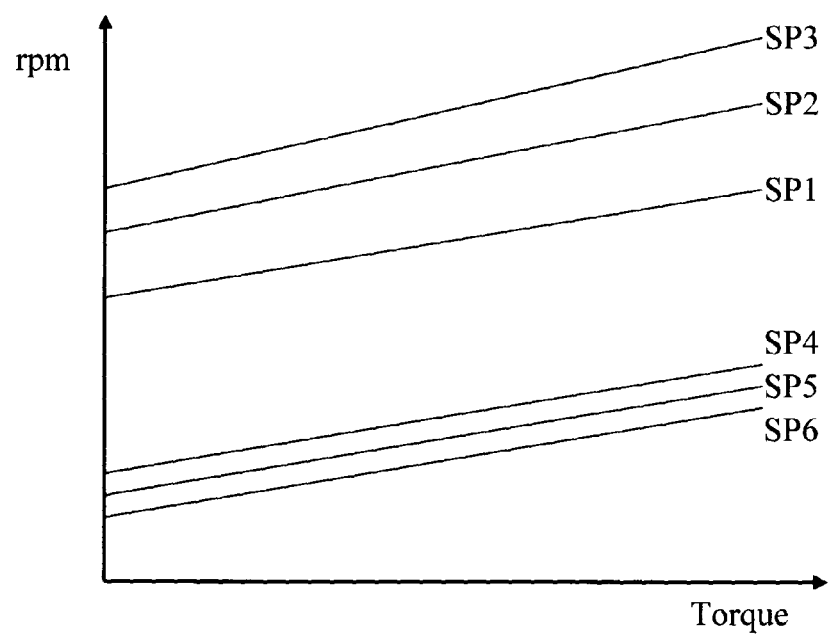
FIG. 6 is a graph of downshift and upshift lines for a gearbox.

FIG. 6 depicts schematically an example of various tabulated shift points represented by lines SP1-SP6 in a graph where the x axis represents engine torque and the y axis the speed of the engine 10 in revolutions per minute (rpm). So long as the engine speed is between shift lines SP1 and SP4 no gear change takes place, but if it rises above an upshift line, SP1-SP3, an upshift is initiated, and conversely a downshift is initiated if the engine speed drops below a downshift line, SP4-SP6. Table 1 below shows a number of upward or downward gear steps for each of the lines SP1-SP6. For example, an upshift by one step takes place if the engine speed rises above line SP1 and a downshift by two steps if the engine speed drops below line SP5.

TABLE 1

| Downshift and upshift lines SP1-SP6 | |
|---|---|
| SP1 | Engine speed for upshift by 1 step |
| SP2 | Engine speed for upshift by 2 steps |
| SP3 | Engine speed for upshift by 3 steps |
| SP4 | Engine speed for downshift by 1 step |
| SP5 | Engine speed for downshift by 2 steps |
| SP6 | Engine speed for downshift by 3 steps |

Shift point choices affect inter alia the running characteristics and fuel consumption of the vehicle 1, so shift points have to be accurately calibrated by vehicle manufacturers. This calibration involves various gearshift strategies being tested in the field in different driving situations, e.g. with different amounts of acceleration applied, different road gradients and different vehicle-combination weights. The test results have then to be thoroughly analysed to establish appropriate shift points.

Numbers of gear steps in conventional gear change systems are further established by the acceleration of the vehicle 1 being regularly measured and the number of gear steps being determined on the basis of the resulting measured data. High measured acceleration leads to more gear steps and low measured acceleration to fewer gear steps in such conventional systems. The measured acceleration is then compared with various acceleration threshold values saved in tables, and it is the determination of said threshold values that decides how many gear steps have to be effected when changing gear in a given running situation. The threshold values are engine-dependent and therefore adapted to a specific engine 10. The determination of appropriate threshold values entails vehicle manufacturers doing comprehensive calibrations in order to arrive at them.

It will therefore be appreciated that the first parameter and/or the second parameter are/is usable in determining the shift points for a gearbox 20, since these parameters provide a measure of the power capacity/acceleration capacity of the vehicle 1. If the vehicle 1 has a large acceleration capacity, shift points which result in low fuel consumption are allowed, which most commonly means a low engine speed, but if the vehicle 1 has low acceleration capacity the endeavour is towards shift points which result in the driving power of the vehicle 1 being as high as possible, which most commonly means a high engine speed due to the then usually high power output.

The first parameter $R_F$ and/or the second parameter $R_{Acc}$ are also usable directly or indirectly (via determination of a virtual accelerator pedal value) in determining a target rotation speed for a gearbox 20. A target speed $\omega_T$ may be construed as a desired speed for the engine 10 of the vehicle 1 and may be determined on the basis of assumptions and knowledge of the mode of operation and performance of the engine 10. An engine 10 usually operates more effectively and better at certain rotation speeds than others. More effectively and better means less fuel consumption, lower vibration levels, quieter running etc. The target speed $\omega_T$ may be within the engine target speed range of 500-2500 rpm, and preferably within the range of 1000-1400 rpm for an engine 10 in a heavy vehicle such as a truck or bus, but is usually higher for passenger cars.

In a gear change system with a target speed $\omega_T$, downshift and upshift points are controlled relative to the target, which means that they are determined on the basis of the speed $\omega_T$. If the vehicle 1 is arranged for stepless transmission ratio change, the speed of the engine 10 may be controlled so that at a low value of $R_{Acc}$ it runs at a speed which results in high motive force, and at a low value of $R_{Acc}$ it runs at a speed which results in low fuel consumption.

Figure 7:
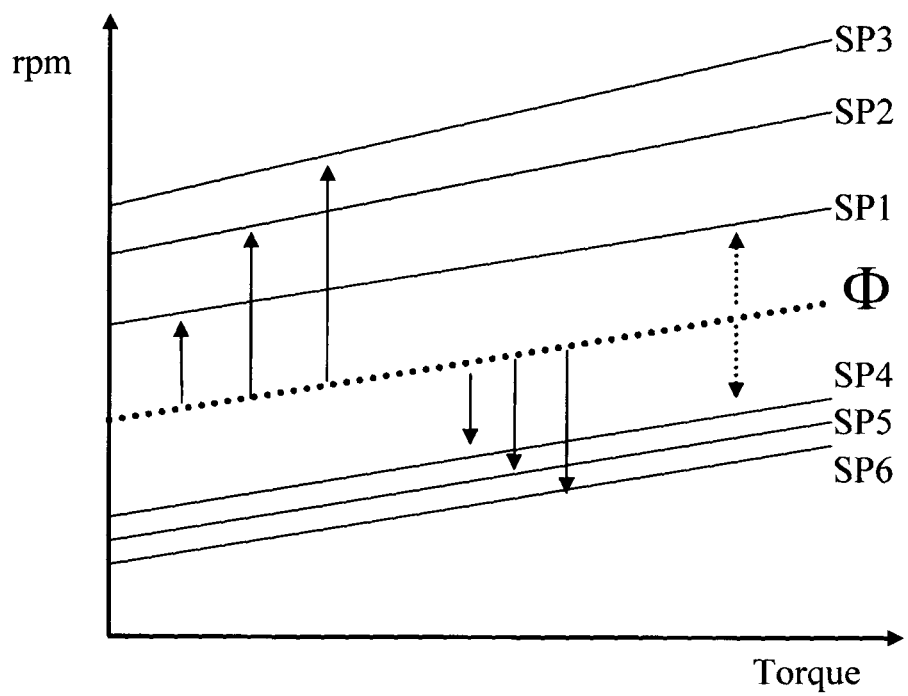
FIG. 7 depicts downshift and upshift lines relating to an engine target speed line.

In FIG. 7 an engine target speed line Φ in the form of a dotted line appears between upshift lines SP1-SP3 and downshift lines SP4-SP6. Arrows in the diagram show how upshift lines SP1-SP3 and downshift lines SP4-SP6 are related to the target speed line Φ. This means that if the target speed line Φ is altered (by being moved upwards or downwards in parallel as per the dotted arrows) the engine speed for the shift lines SP1-SP6 will also move in parallel. The shift lines SP1-SP6 may for example accompany the target speed line Φ proportionally with a scale factor which may be different for upshift and downshift lines respectively but may also be the same, in which case an established mutual relationship between the upshift and downshift points is achieved. It is also possible to have an individual scale factor for each shift line SP1-SP6, i.e. certain shift lines SP1-SP6 may change more or less than other shift lines SP1-SP6 in response to the same change in the target speed line Φ.

Further descriptions and examples of areas of application for the first parameter $R_F$ and/or the second parameter $R_{Acc}$ appear in the unpublished Swedish patent applications SE 0950654-4, SE 0950655-1, SE 0950656-9, SE 0950668-4, SE 0950657-7, SE 0950658-5, SE 0950659-3, SE 0950667-6, SE 0901182-6 and SE 0950660-1. Said parameters are also usable in applications described in three unpublished Swedish patent applications entitled "Method and system for driving of a vehicle I", "Method and system for driving of a vehicle II" and "Method and system for driving of a vehicle III", all of them with the same filing date as the present application and by the same applicant.

As specialists will appreciate, a method for determination of a first parameter $R_F$ or second parameter $R_{Acc}$ representing respectively an absolute measure (i.e. motive force capacity) and a relative measure for acceleration capacity of a vehicle 1 according to the present invention may also be implemented in a computer program which, when executed in a computer, causes the computer to apply the method. The computer program is comprised in a computer-readable medium of a computer program product, which medium comprises a suitable memory, e.g. a ROM (read-only memory), PROM (programmable read-only memory), EPROM (erasable PROM), flash memory, EEPROM (electrically erasable PROM), a hard disc unit, etc.

The invention relates also to a system for determining the first parameter $R_F$ or the second parameter $R_{Acc}$ in accordance with the determination of said parameters according to any of the above methods.

Figure 8:
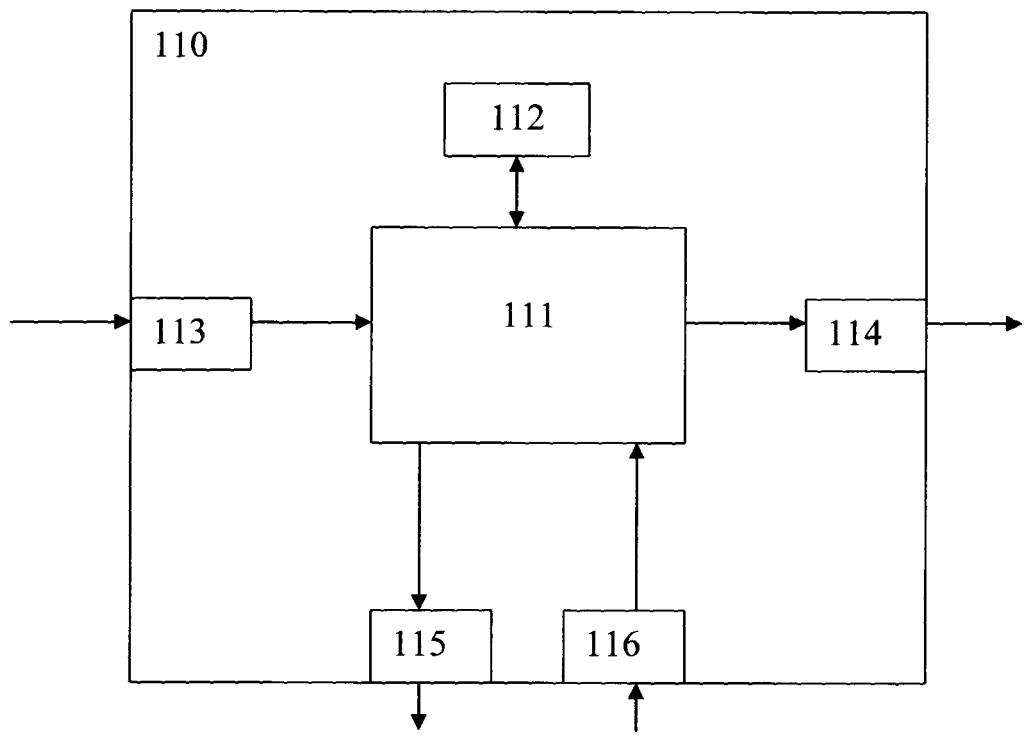
FIG. 8 depicts a control unit intended to form part of a system according to the invention.

The system according to the invention comprises at least one control unit 110 which is schematically depicted in FIG. 8 and which may itself comprise a calculation unit 111 which may take the form of substantially any suitable type of processor or microcomputer, e.g. a circuit for digital signal processing (digital signal processor, DSP) or a circuit with a predetermined specific function (application specific integrated circuit, ASIC). The calculation unit 111 is connected to a memory unit 112 which is incorporated in the control unit 110 and which provides the calculation unit 111 with, for example, the stored program code and/or the stored data which the calculation unit 111 needs for it to be able to perform calculations. The calculation unit 111 is also adapted to storing partial or final results of calculations in the memory unit 112.

The control unit 110 is further provided with devices 113, 114, 115, 116 for receiving input signals and sending output signals. These input and output signals may comprise waveforms, pulses or other attributes which the signal receiving devices 113, 116 can detect as information and which can be converted to signals processable by the calculation unit 111. The calculation unit 111 is then provided with these signals. The signal sending devices 114, 115 are adapted to converting signals received from the calculation unit 111 in order, e.g. by modulating them, to create output signals which can be transmitted to other parts of the system for determination of downshift and upshift points. One skilled in the art will appreciate that the aforesaid computer may take the form of the calculation unit 111 and that the aforesaid memory may take the form of the memory unit 112.

Each of the connections to the devices for receiving input signals and sending output signals may take the form of one or more from among a cable, a data bus, e.g. a CAN (controller area network) bus, an MOST (media orientated systems transport) bus or some other bus configuration, or a wireless connection. The connections 70, 80, 90, 100 in FIG. 1 may also take the form of one or more of these cables, buses or wireless connections.

Specialists will further appreciate that the system according to the invention may be modified according to the various embodiments of the method for determining the first parameter $R_F$ or the second parameter $R_{Acc}$ according to the invention.

The invention relates also to a vehicle 1, e.g. a passenger car, truck or bus, which comprises at least one system for determining the first parameter $R_F$ or the second parameter $R_{Acc}$ according to the invention.

Finally, the present invention is not limited to its embodiments described above, but relates to and comprises all embodiments of the invention within the scope of protection of the attached independent claims.

The invention claimed is:

1. A method for determining a first parameter $R_F$ which represents a motive force capacity of a motor vehicle, wherein the vehicle includes a power train which is configured and operable to assume various transmission ratios for propulsion of the vehicle and the power train comprises an engine, drivable devices of the vehicle which are driven by the engine and a gearbox, operable to set transmission ratios, and the gearbox is connected between the engine and the drivable devices, the method comprising:
   receiving, by an electronic processor, a reading representing a then current actual motive force for the engine, the then current actual motive force including a running resistance;
   determining, by the electronic processor, the first parameter $R_F$ based on a difference between a first motive force $F_{Max}$ and the second motive force $F_{Dr}$, wherein the first motive force $F_{Max}$ is a maximum motive force available for the vehicle based on maximum engine torque, according to the engine's maximum torque curve, at a then current transmission ratio: and the second motive force $F_{Dr}$ is determined according to the reading received;
   determining a second parameter $R_{Acc}$ representing an acceleration capacity of the vehicle and defined as a ratio between the first parameter $R_F$ and a standardising factor; and
   outputting a signal based on at least one of the first parameter and the second parameter to a vehicle controller for controlling at least one of a determination of a virtual accelerator pedal value, a gear change choice, a gear change strategy, a compressor, a generator, an air conditioner pump or other ancillary device, a cruise control function, and an indication of a driving hint for a driver of the motor vehicle.

2. The method according to claim 1, wherein, the first motive force $F_{Max}$ is for propelling the vehicle via the power train in a direction of movement of the vehicle at a current maximum engine torque available for the engine.

3. The method according to claim 1, wherein the second motive force $F_{Dr}$ may assume a positive value or a negative value and acts upon the vehicle in the direction of movement of the vehicle and which depends on one or more parameters selected from the group consisting of air resistance, rolling resistance, friction in the power train, moment of inertia, topographical map data, road gradient, and weight of the vehicle.

4. The method according to claim 2, wherein, the first motive force $F_{Max}$ is defined as $F_{Max}=Eng_{Tot} \times i_{Tot}$,
   where $Eng_{Tot}$ denotes a maximum engine torque available for the engine at the then current engine speed, and
   $i_{Tot}$ denotes a current transmission ratio for the power train up to and including powered wheels of the power train, taking a wheel radius of the vehicle into account, and
   the second motive force $F_{Dr}$, is defined as $F_{Dr}=F_{Rf}-m \times a$,
   where $F_{Rf}$ denotes the then current actual motive force for the engine, m a weight, and a an acceleration for the vehicle.

5. The method according to claim 1, wherein the first parameter $R_F$ is defined by an equation $R_F=F_{Max}-F_{Dr}$, and wherein the vehicle is in motive force surplus if $R_F>0$, is in motive force deficit if $R_F<0$ and is in motive force equilibrium if $R_F=0$.

6. The method according to claim 1, wherein the second parameter $R_{Acc}$ is determined by the equation $$R_{Acc} = \frac{F_{Max} - F_{Dr}}{F_{Max}} = \frac{R_F}{F_{Max}},$$

wherein the vehicle is in acceleration surplus if $R_{Acc} > 0$, is in acceleration deficit if $R_{Acc} < 0$, and is in acceleration equilibrium if $R_{Acc} = 0$.

7. The method according to claim 1, wherein the vehicle comprises at least one control unit configured and operable to control one or more functions of the vehicle, and at least one of the first parameter $R_F$ and the second parameter $R_{Acc}$ is determined continuously in real time by the control unit.

8. The method according to claim 1, wherein the vehicle is a member of the group comprising a passenger car, a bus or a truck.

9. A non-transitory computer-readable medium product incorporating a program which comprises program code and which, when the program code is executed in a computer, causes the computer to apply a method for determining a first parameter RF which represents a motive force capacity of a motor vehicle, wherein the vehicle includes a power train which is configured and operable to assume various transmission ratios for propulsion of the vehicle and the power train comprises an engine, drivable devices of the vehicle which are driven by the engine and a gearbox, operable to set transmission ratios, and the gearbox is connected between the engine and the drivable devices, the method comprising:

receiving, by an electronic processor, a reading representing a then current actual motive force for the engine, the then current actual motive force including a running resistance;

determining, by the electronic processor, the first parameter $R_F$ based on a difference between a first motive force $F_{Max}$ and the second motive force $F_{Dr}$, wherein the first motive force $F_{Max}$ is a maximum motive force available for the vehicle based on maximum engine torque, according to the engine's maximum torque curve, at a then current transmission ratio: and the second motive force $F_{Dr}$ is determined according to the reading received;

determining a second parameter $R_{Acc}$ representing an acceleration capacity of the vehicle and defined as a ratio between the first parameter RF and a standardising factor; and outputting a signal based on at least one of the first parameter and the second parameter to a vehicle controller for controlling at least one of a determination of a virtual accelerator pedal value, a gear change choice, a gear change strategy, a compressor, a generator, an air conditioner pump or other ancillary device, a cruise control function, and an indication of a driving hint for a driver of the motor vehicle.

10. The non-transitory computer-readable medium according to claim 9, wherein the computer-readable medium is at least one of ROM (read-only memory), PROM (programmable ROM), EPROM (erasable PROM), flash memory, EEPROM (electrically erasable PROM) and hard disc unit.

11. A system for determination of a first parameter $R_F$ which represents a motive force capacity of a motor vehicle including a power train that assumes various transmission ratios for propulsion of the motor vehicle, the system comprising:

an input receiving unit configured to receive a reading representing a then current actual motive force for the engine, the then current actual motive force including a running resistance;

at least one electronic control unit configured and operable to control one or more functions of the vehicle, the at least one electronic control unit is configured and operable:

to determine the first parameter $R_F$ based on a difference between a first motive force $F_{Max}$ and a second motive force $F_{Dr}$, wherein the first motive force $F_{Max}$ is a maximum motive force available for the vehicle based on maximum engine torque, according to the engine's maximum torque curve, at a then current transmission ratio, and the second motive force $F_{Dr}$ is determined according to the reading received; and wherein the control unit is further configured and operable:

to determine a second parameter $R_{Acc}$ representing an acceleration capacity of the vehicle and defined as a ratio between the first parameter $R_F$ and a standardising factor, and to output a signal based on at least one of the first parameter and the second parameter to a vehicle controller for controlling at least one of a determination of a virtual accelerator pedal value, a gear change choice, a gear change strategy, a compressor, a generator, an air conditioner pump or other ancillary device, a cruise control function, and an indication of a driving hint for a driver of the motor vehicle.

12. The system according to claim 11, wherein the second parameter $R_{Acc}$ is determined by the equation, $$R_{Acc} = \frac{F_{Max} - F_{Dr}}{F_{Max}} = \frac{R_F}{F_{Max}},$$

the vehicle is in acceleration surplus if $R_{Acc} > 0$, is in acceleration deficit if $R_{Acc} < 0$ and is in acceleration equilibrium if $R_{Acc} = 0$.

13. A motor vehicle which comprises at least one system for determination of a first parameter $R_F$ which represents a motive force capacity of a motor vehicle including a power train that assumes various transmission ratios for propulsion of the motor vehicle, the at least one system comprising:

an input receiving unit configured to receive a reading representing a then current actual motive force for the engine, the then current actual motive force including a running resistance;

at least one electronic control unit configured and operable to control one or more functions of the vehicle, the at least one electronic control unit is configured and operable:

to determine the first parameter $R_F$ based on a difference between a first motive force $F_{Max}$ and a second motive force $F_{Dr}$, wherein the first motive force $F_{Max}$ is a maximum motive force available for the vehicle based on maximum engine torque, according to the engine's maximum torque curve, at a then current transmission ratio, and the second motive force $F_{Dr}$ is determined according to the reading received; and wherein the control unit is further configured and operable:

to determine a second parameter $R_{Acc}$ representing an acceleration capacity of the vehicle and defined as a ratio between the first parameter $R_F$ and a standardising factor, and to output a signal based on at least one of the first parameter and the second parameter to a vehicle controller for controlling at least one of a determination of a virtual accelerator pedal value, a gear change choice, a gear change strategy, a compressor, a generator, an air conditioner pump or other ancillary device, a cruise control function, and an indication of a driving hint for a driver of the motor vehicle.

14. A motor vehicle comprising a power train and a system for determination of a first parameter $R_F$ which represents a motive force capacity of a motor vehicle including a power train that assumes various transmission ratios for propulsion of the motor vehicle, the system comprising:

an input receiving unit configured to receive a reading representing a then current actual motive force for the engine, the then current actual motive force including a running resistance;

at least one electronic control unit configured and operable to control one or more functions of the vehicle, the at least one electronic control unit is configured and operable:

to determine the first parameter $R_F$ based on a difference between a first motive force $F_{Max}$ and a second motive force $F_{Dr}$, wherein the first motive force $F_{Max}$ is a maximum motive force available for the vehicle based on maximum engine torque, according to the engine's maximum torque curve, at a then current transmission ratio, and the second motive force $F_{Dr}$ is determined according to the reading received; and wherein the control unit is further configured and operable:

to determine a second parameter $R_{Acc}$ representing an acceleration capacity of the vehicle and defined as a ratio between the first parameter $R_F$ and a standardising factor, and to output a signal based on at least one of the first parameter and the second parameter to a vehicle controller for controlling at least one of a determination of a virtual accelerator pedal value, a gear change choice, a gear change strategy, a compressor, a generator, an air conditioner pump or other ancillary device, a cruise control function, and an indication of a driving hint for a driver of the motor vehicle.

* * * * *